(12) United States Patent
Lockwood et al.

(10) Patent No.: US 8,425,076 B2
(45) Date of Patent: Apr. 23, 2013

(54) SOLAR POWERED AIRFIELD LIGHT

(75) Inventors: Aaron John Lockwood, Victoria (CA); Brock Johnston, Brentwood Bay (CA)

(73) Assignee: Carmanah Technologies Corp., Victoria, British Columbia (CA)

( * ) Notice: Subject to any disclaimer, the term of this patent is extended or adjusted under 35 U.S.C. 154(b) by 0 days.

(21) Appl. No.: 13/259,687

(22) PCT Filed: Mar. 31, 2009

(86) PCT No.: PCT/CA2009/000422
§ 371 (c)(1),
(2), (4) Date: Sep. 23, 2011

(87) PCT Pub. No.: WO2010/111769
PCT Pub. Date: Oct. 7, 2010

(65) Prior Publication Data
US 2012/0020058 A1 Jan. 26, 2012

(51) Int. Cl.
*E01F 9/00* (2006.01)
(52) U.S. Cl.
USPC ........ 362/153.1; 362/479; 362/310; 362/329; 362/363
(58) Field of Classification Search ............. 362/20, 362/153, 153.1, 159, 183, 217.01, 217.02, 362/219, 235–237, 240, 244, 245, 249.01, 362/249.02, 308–310, 311.01, 311.02, 329, 362/334, 335, 362, 363, 479, 493, 540, 542, 362/555, 800
See application file for complete search history.

(56) References Cited

U.S. PATENT DOCUMENTS

| | | | |
|---|---|---|---|
| 2,773,172 A | 12/1956 | Pennow | |
| 3,886,347 A | 5/1975 | Dorman | |
| 4,638,411 A | 1/1987 | Trainor | |
| 4,910,649 A | 3/1990 | Vadseth | |
| 5,230,560 A | 7/1993 | Lyons | |
| 5,984,570 A * | 11/1999 | Parashar | 404/14 |
| 6,013,985 A | 1/2000 | Green et al. | |
| 6,086,220 A * | 7/2000 | Lash et al. | 362/244 |
| 6,425,678 B1 | 7/2002 | Verdes et al. | |
| 6,598,998 B2 | 7/2003 | West et al. | |
| 6,602,021 B1 * | 8/2003 | Kim | 404/16 |
| 6,679,621 B2 | 1/2004 | West et al. | |
| 6,932,496 B2 | 8/2005 | Rizkin et al. | |
| 7,018,131 B2 * | 3/2006 | Jordan | 404/16 |
| 7,083,315 B2 | 8/2006 | Hansler et al. | |
| 7,192,155 B2 | 3/2007 | Morrow et al. | |
| 7,329,029 B2 | 2/2008 | Chaves et al. | |
| 7,473,937 B2 | 1/2009 | Park et al. | |
| 7,503,669 B2 | 3/2009 | Rizkin et al. | |
| 7,794,103 B2 * | 9/2010 | Hoover | 362/153.1 |
| 2006/0291209 A1 | 12/2006 | Booth et al. | |

FOREIGN PATENT DOCUMENTS

| WO | WO9830834 A1 | 7/1998 |
|---|---|---|
| WO | WO 9830834 A1 * | 7/1998 |

* cited by examiner

*Primary Examiner* — Hargobind S Sawhney
(74) *Attorney, Agent, or Firm* — Quarles & Brady LLP; Gavin J. Milczarek-Desai

(57) ABSTRACT

A solar-powered airfield light provides high angle light up to about 90°. A solar panel is mounted atop the enclosure but does not overlie a curved transparent shoulder extending upward from the transparent generally cylindrical side walls of the enclosure. An optical element within the enclosure surrounds an LED light source so as to direct light emanating from the LED in two preferential beams, one directed to the shoulder and the other directed to the side walls. A portion of the light impinging on the curved shoulder is redirected to high angles to comply with high angle light requirements for airfield lights.

18 Claims, 4 Drawing Sheets

SOLAR POWERED AIRFIELD LIGHT

FIELD OF THE INVENTION

This invention relates to solar-powered airfield lights.

BACKGROUND OF THE INVENTION

Traditional airfield lighting products, such as taxiway lights, comprise a light source enclosed in an optical element that directs the light into an appropriate beam while protecting the light source from the environment.

The traditional optical element is usually a Fresnel optic designed to create a substantially horizontal fan beam. Traditional airfield lights using LEDs are illustrated in U.S. Pat. Nos. 7,192,155 and 6,425,678 and in FIG. 1. The horizontal fan beam, extending between the horizon and about 10° above the horizon, is directed at air traffic. Because the optical element is clear on top, a substantial amount of light shines upwards, to angles between 10° and 90° from the horizon.

In fact, high angle light is required by the Federal Aviation Administration (FAA) for taxiway lights as set out in FAA Advisory Circular (AC) 150/5345-46c, under the designation L-861T. Additionally, high angle light is often needed from runway edge lights as well. While such requirement is not part of FAA requirements, the International Civil Aviation Organization (ICAO) requires light at high angles when the runway edge lights lights are to be used for circling guidance.

Solar powered LED airfield lights, as illustrated in FIG. 2, are becoming increasingly accepted as an alternative to traditional electrical grid-powered lights. Like traditional lights, they often use a Fresnel lens. However, unlike the traditional lights, they often have a solar panel on the top. The panel is opaque and overhangs the optical element thereby limiting the amount of light that can be directed upwards to high angles, as illustrated for example in U.S. Pat. No. 6,013,985. It is thought that this is one of the reasons that the FAA has thus far been reluctant to approve solar-powered airfield lights.

It is therefore an object of the present invention to provide an airfield light that is solar-powered, having a solar panel covering the top of the light, and that nonetheless provides high angle light to comply with high angle light requirements for taxiway and runway edge lights.

This and other objects of the invention will be better understood by reference to the detailed description of the preferred embodiment which follows.

SUMMARY OF THE INVENTION

According to the invention, the airfield light includes an enclosure having transparent, substantially cylindrical sides. A solar panel is mounted atop the enclosure but does not overlie a curved transparent shoulder extending upward from the sides of the enclosure. An optical element within the enclosure surrounds an LED light source so as to direct light emanating from the LED in two preferential beams, one directed to the shoulder and the other directed to the sides. A portion of the light impinging on the curved shoulder is redirected to high angles of up to about 90° to comply with high angle light requirements for airfield lights. The light passing through the sidewall is transmitted in a substantially horizontal direction, with minimal to no diffusion or refraction of the light at angles greater than 10° from the horizontal.

In one aspect, the invention comprises an airfield light comprising an enclosure having a substantially cylindrical side wall, a top and a curved shoulder extending between the side wall and the top, the side wall and the shoulder being transparent; an LED light source housed in the enclosure; an optical element surrounding the light source; a solar panel mounted substantially across the top; the optical element for distributing light emanating from the source toward the side wall and the shoulder.

In a further aspect, the optical element may comprise dual distribution pattern for directing a first portion of light emanating from the light source in the direction of the shoulder and for directing the balance of light emanating from the light source in the direction of the side wall.

In a further aspect, the shoulder may be configured to propagate light incident from the optical element outward of the enclosure at angles within 6 and 90 degrees to the horizontal.

In another aspect, the invention comprises a solar-powered airfield light comprising an LED light source; an enclosure housing the light source and having a top portion having a horizontal footprint/extent; a solar panel extending substantially across the horizontal footprint/extent; the enclosure having a substantially cylindrical side wall and an upper curved shoulder, at least a portion of the shoulder lying outside the footprint/extent; the airfield light being configured to propagate light emanating from the source substantially laterally through the side wall and through the shoulder at angles within 6 and 90 degrees to the horizontal.

In yet another aspect, the invention comprises a solar powered airfield light comprising: an enclosure having a top; at least one LED light source housed within the enclosure; a solar panel to power the light source, the solar panel being mounted on the top of the enclosure; the enclosure comprising a first optical element having at least a first and a second transmissive regions to transmit light emitted by the light source outward of the enclosure, the solar panel not overlying the second transmissive region; a second optical element between the light source and the first optical element to selectively direct a first portion of the light emitted by the light source towards the first transmissive region and to selectively direct the balance of the light emitted by the light source towards the second transmissive region.

The first transmissive region may transmit light at lower angles to the horizontal than does the second transmissive region and the second transmissive region may transmit light at angles up to about 90° to the horizontal. The first transmissive region may have an internally ribbed texture. The second transmissive region may comprise a curved shoulder extending from the top of the first transmissive region.

The airfield light of claim 5 wherein the second optical element has a first portion having a first shape adapted to selectively direct the first portion of the light emitted by the light source towards the first transmissive region, and a second portion having a second shape to selectively direct the balance of the light emitted by the light source towards the second transmissive region.

The optical element may comprise a first internally concave portion that refracts low angle light from the light source at high angles toward the second transmissive region, and a second, internally convex, portion that refracts high angle light from the light source at low angles toward the first transmissive region.

In yet another aspect, the invention comprises a solar-powered airfield light, comprising a first optical element comprising an opaque region, a transmissive region, and a refracting region; a second optical element within the first optical element; and a light source within the second optical element; the second optical element being adapted to direct light from the light source away from the opaque region and to direct a first portion of the light toward the transmissive region and a second portion of the light toward the refractive region. The opaque region may be formed by a solar panel mounted on the first optical element. The transmissive region may be adapted to transmit light along substantially horizontal planes. The refractive region may be adapted to transmit light at angles up to 90 degrees from a horizontal plane. The first portion of light may be initially emitted from the light source at a high angle and the second portion of light may be initially emitted from the light source at a low angle.

In another aspect, the invention comprises an airfield light comprising: a light source within an enclosure, the enclosure comprising a refractive region and a transmissive region; and an optical element between the light source and the enclosure; wherein the optical element comprises an internally concave portion that refracts low angle light from the light source at high angles toward the refractive region, and an internally convex portion that refracts high angle light from the light source at low angles toward the transmissive region. The enclosure may further comprise an opaque region, which may be formed by a solar panel mounted on the enclosure. The transmissive region may be adapted to transmit light along substantially horizontal planes. The refractive region may be adapted to transmit light at angles up to 90 degrees from a horizontal plane.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The invention will be described by reference to the detailed description of the preferred embodiment and to the drawings thereof in which.

DETAILED DESCRIPTION OF THE PREFERRED EMBODIMENT

Figure 1:
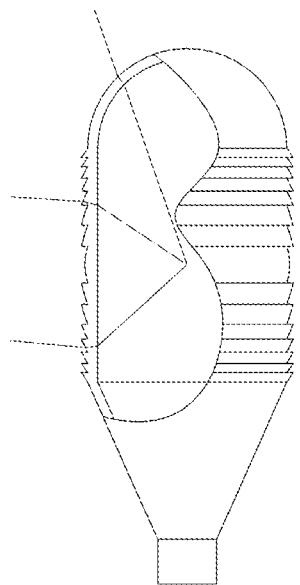
FIG. 1 is a side elevation and partly sectioned view of a traditional airfield light.
Figure 2:
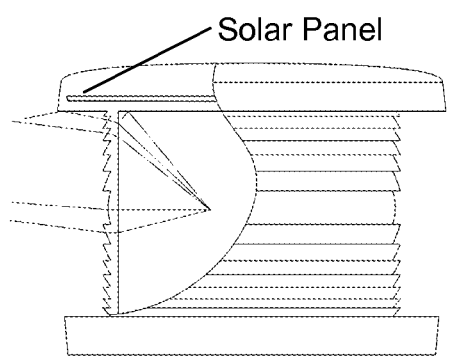
FIG. 2 is a side elevation, partly sectioned view of a traditional solar-powered airfield light.
Figure 3:
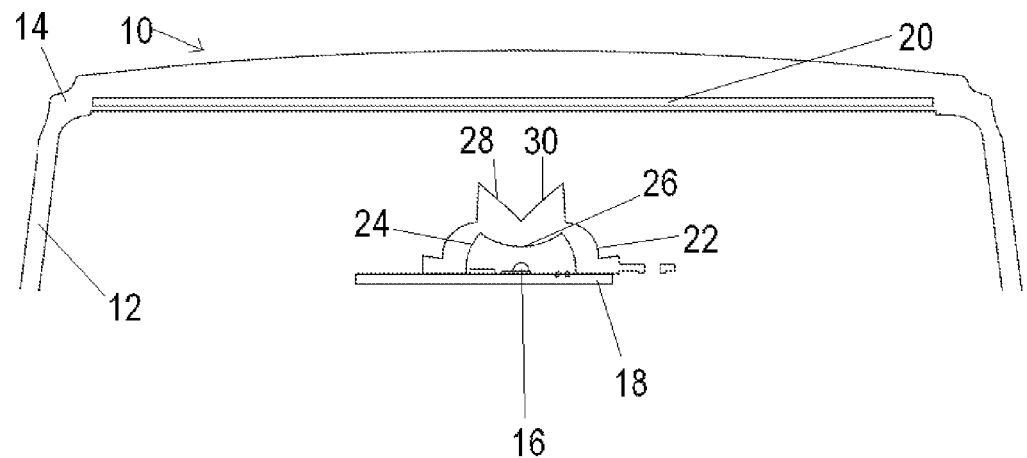
FIG. 3 is a cross-sectional view of the solar-powered airfield light according to the preferred embodiment of the invention.

Referring to FIG. 3, the preferred embodiment of the invention includes a first optical element, which may be an enclosure 10 having a substantially cylindrical side wall 12 and a curved shoulder portion 14. The side wall 12 need not be perfectly cylindrical and may define a slight angle to the vertical as shown in FIG. 3. Each of side wall 12 and shoulder portion 14 is transparent.

One or more LEDs 16 are mounted on a circuit board 18 within the enclosure 10. A solar panel 20 is mounted on the top of the enclosure 10, thereby forming an opaque region. The solar panel 20 overlies the LED and defines a horizontal footprint that extends beyond the footprint of the circuit board 18 but which footprint does not encompass the shoulder portion 14.

Figure 4:
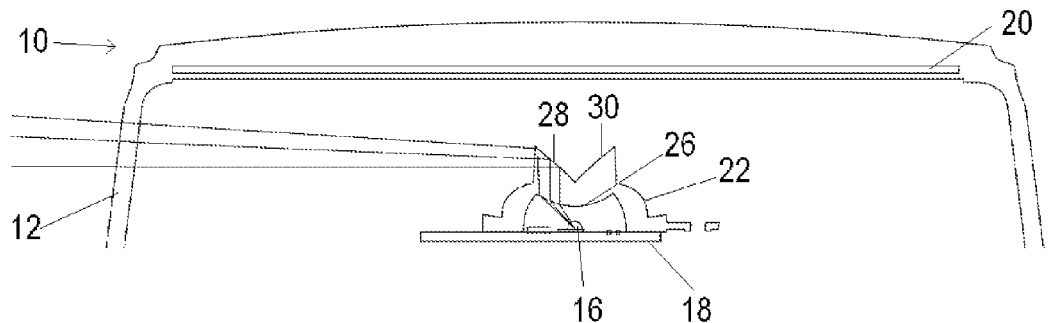
FIG. 4 is a cross-sectional view of the airfield light according to the invention showing the direction of light distributed by one portion of the optical element.
Figure 5:
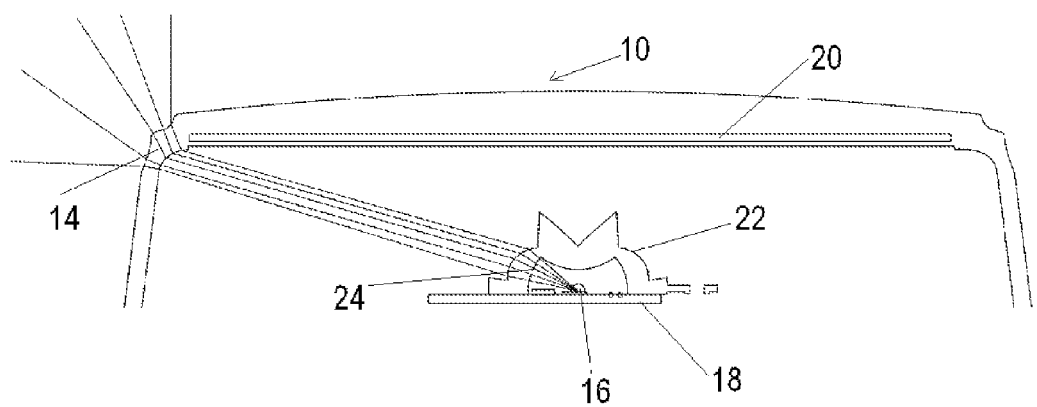
FIG. 5 is a cross-sectional view of the airfield light according to the invention showing the direction of light distributed by another portion of the optical element.

An optical element 22 surrounds the LED 16 for distributing a portion of the light emanating from LED 16 toward the side wall 12 on the one hand, as shown in FIG. 4 and another portion of the light emanating from LED 16 toward the shoulder 14, as shown in FIG. 5.

In the preferred embodiment, the optical element 22 comprises a first curved circumferential and internally concave portion 24 that acts to refract light on each of its internal and external surfaces to direct low angle light from the LED at high angles toward the shoulder 14. A second top portion 26 of the optical element is internally convex and comprises external angular facets 28, 30 to direct high angle light from the LED 16 toward the side wall 12.

The light transmitted through the first portion 24 reaches shoulder 14 at a relatively high angle of incidence in relation to the horizontal. The curved shoulder 14, which is not obstructed by the footprint of the solar panel 20, forms a refracting region, which bends and scatters the light over a wide range of angles, facilitating the transmission of light from the enclosure at angles of up to 90° from the horizontal, as seen in FIG. 5.

Top portion 26 and external angular facets 28, 30 of the optical element 22 redirect light traveling upward from the LED 16, thereby preventing the light from reaching the underside of solar panel 20. Preferably, the external angular facets 28, 30 are capable of substantially total internal reflection (TIR), which maximizes the amount of light being directed the sides of the enclosure 10 while eliminating light directed to the solar panel 20, as best seen in FIG. 4. External angular facets 28, 30 direct the light towards transparent side wall 12 along a substantially horizontal plane.

Transparent side wall 12 is a transmissive region, designed to directly transmit this reflected light from the enclosure 10 without diffusing or refracting the light away from the horizontal plane. The light therefore fans out from enclosure 10 at angles of less than about 10° from the horizontal.

The shoulder 14 of the enclosure 10 may have optically smooth surfaces or it may have textured, rough or other light-scattering surfaces, such as a charmilles texture or details, such as curves, ridges or internal imperfections.

Figure 6:
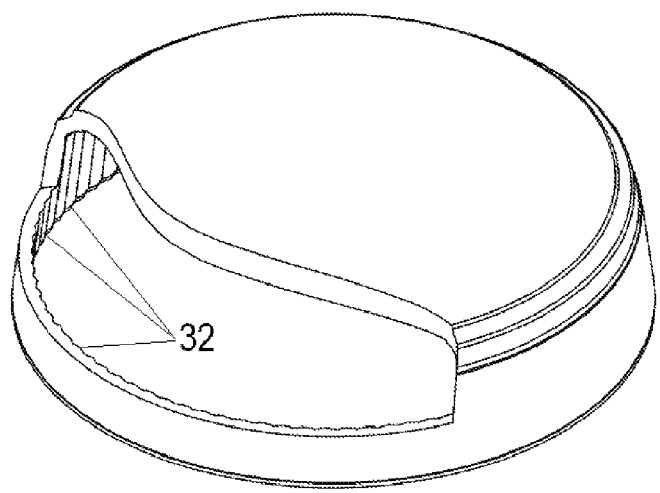
FIG. 6 is a perspective, partly sectioned view of an embodiment of the enclosure of the airfield light according to the invention showing vertical ribbing on the internal cylindrical side wall of the enclosure.
Figure 7:
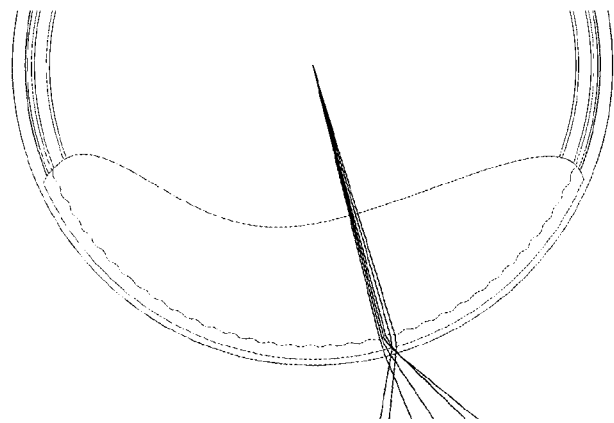
FIG. 7 is a plan, partly sectioned view of the enclosure of FIG. 6 showing the direction of light diffused by the ribbing of the enclosure side wall.

Side wall 12 may be optically clear, or it may have vertical ribs 32 to provide an internal ribbed texture which diffuses the light horizontally without refracting the light beams vertically. FIG. 6 ilustrates the vertical ribs 32 and FIG. 7 illustrates the horizontal diffusion of light rays by the ribs.

In the preferred embodiment, the light rays that are initially emitted in a sideways or horizontal direction from the light source 16 first contact the curved circumferential and internally concave portion 24, which directs the rays toward shoulder 14. This initially low-angle light is therefore emitted by the airfield light 10 as high-angle light, as shown in FIG. 5. Similarly, the light rays initially emitted by the light source 16 in an upward direction will first contact the internally convex top portion 26, which will direct the light to external angular facets 28, 30 and then toward side wall 12. This initially high-angle light is therefore emitted as low-angle light, as shown in FIG. 4. This "criss-cross" effect is a most efficient and effective way of ensuring that all light is captured and re-directed to the shoulder 14 and side wall 12 of enclosure 10, minimizing the light energy that might otherwise hit the solar panel 20 or be reflected off various surfaces within the enclosure 10, and be lost or wasted.

Figure 8:
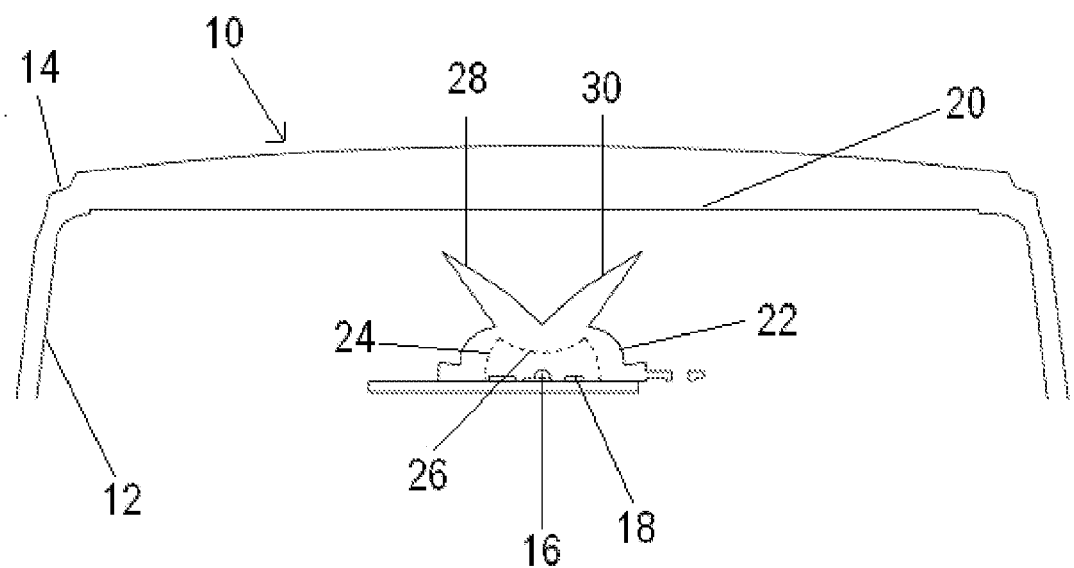
FIG. 8 is a cross-sectional view of the airfield light according to the invention showing an alternate shape for the optical element.

Any space between the LED 16 and the optical element 22 may be filled with air or an optical coupling media. The optical coupling media could be silicone, epoxy or a similar material that matches as closely as possible the index of refraction of the material of which optical element 22 is composed. Alternatively, the optical coupling media may also have a different index of refraction than the optical element 22 material. In any case, the shape of the optical element 22 of the preferred embodiment may be varied as necessary to provide a substantially dual distribution pattern wherein a portion of the light is directed toward the shoulder while another portion of the light is directed toward the side wall. FIG. 8 shows an embodiment wherein optical element 22 has a slightly different configuration, wherein the shapes and angles of first portion 24, top portion 26 and external angular facets 28, 30 are selected to optimally direct the light toward should 14 and side wall 12, perhaps impacted by the selection of air or other optical coupling media between the LED 16 and the optical element 22. However, the overall shape and effect of each part of optical element 22 is similar to that shown in the other figures.

It will be appreciated by those skilled in the art that the preferred and alternative embodiments have been described in some detail but that other modifications may be practiced without departing from the principles of the invention.

The invention claimed is:

1. An airfield light comprising:
   an enclosure having a substantially cylindrical side wall, a top and a curved shoulder extending between said side wall and said top, said side wall and said shoulder being transparent;
   an LED light source housed in said enclosure;
   an optical element surrounding said light source;
   a solar panel mounted substantially across said top;
   said optical element for distributing light emanating from said source toward said side wall and said shoulder; and
   said optical element having a dual distribution pattern for directing a first portion of light emanating from said light source in the direction of said shoulder and for directing the balance of light emanating from said light source in the direction of said side wall.

2. The airfield light of claim 1 wherein said shoulder is configured to propagate light incident from said optical element outward of said enclosure at angles within 6 and 90 degrees to the horizontal.

3. A solar powered airfield light comprising:
   an enclosure having a top;
   at least one LED light source housed within said enclosure;
   a solar panel to power said light source, said solar panel being mounted on said top of said enclosure;
   said enclosure comprising a first optical element having at least a first and a second transmissive regions to transmit light emitted by said light source outward of said enclosure, said solar panel not overlying said second transmissive region; and
   a second optical element between said light source and said first optical element to selectively direct a first portion of the light emitted by said light source towards said first transmissive region and to selectively direct the balance of the light emitted by said light source towards said second transmissive region;
   wherein said first transmissive region transmits light at lower angles to the horizontal than does said second transmissive region; and
   wherein said second transmissive region transmits light at angles up to about 90° to the horizontal.

4. The airfield light of claim 3 wherein said second transmissive region is a curved shoulder extending from the top of said first transmissive region.

5. The airfield light of claim 4 wherein said first transmissive region has an internally ribbed structure.

6. The airfield light of claim 3 wherein said second optical element has a first portion having a first shape adapted to selectively direct said first portion of the light emitted by said light source towards said first transmissive region, and a second portion having a second shape to selectively direct said balance of said light emitted by said light source towards said second transmissive region.

7. The airfield light of claim 6 wherein said optical element comprises a first internally concave portion that refracts low angle light from said light source at high angles toward said second transmissive region, and a second, internally convex, portion that refracts high angle light from said light source at low angles toward said first transmissive region.

8. The airfield light of claim 3 wherein said first transmissive region has an internally ribbed texture.

9. A solar-powered airfield light, comprising:
   a first optical element comprising an opaque region, a transmissive region, and a refracting region;
   a second optical element within said first optical element; and
   a light source within said second optical element;
   said second optical element being adapted to direct light from said light source away from said opaque region and to direct a first portion of said light toward said transmissive region and a second portion of said light toward said refractive region.

10. The airfield light of claim 9 wherein said opaque region is formed by a solar panel mounted on said first optical element.

11. The airfield light of claim 9 wherein said transmissive region is adapted to transmit light along substantially horizontal planes.

12. The airfield light of claim 9 wherein said refractive region is adapted to transmit light at angles up to 90 degrees from a horizontal plane.

13. The airfield light of claim 9 wherein said first portion of light is initially emitted from said light source at a high angle and said second portion of light is initially emitted from said light source at a low angle.

14. An airfield light comprising:
   a light source within an enclosure, said enclosure comprising a refractive region and a transmissive region; and
   an optical element between said light source and said enclosure;
   wherein said optical element comprises an internally concave portion that refracts low angle light from said light source at high angles toward said refractive region, and an internally convex portion that refracts high angle light from said light source at low angles toward said transmissive region.

15. The airfield light of claim 14 wherein said enclosure further comprises an opaque region.

16. The airfield light of claim 15 wherein said opaque region is formed by a solar panel mounted on said enclosure.

17. The airfield light of claim 14 wherein said transmissive region is adapted to transmit light along substantially horizontal planes.

18. The airfield light of claim 15 wherein said refractive region is adapted to transmit light at angles up to 90 degrees from a horizontal plane.

* * * * *

UNITED STATES PATENT AND TRADEMARK OFFICE
CERTIFICATE OF CORRECTION

PATENT NO. : 8,425,076 B2  
APPLICATION NO. : 13/259687  
DATED : April 23, 2013  
INVENTOR(S) : Aaron J. Lockwood and Brock Johnston It is certified that error appears in the above-identified patent and that said Letters Patent is hereby corrected as shown below:

In the Claims:

Column 6, Claim 18, line 65, "claim 15" should be -- claim 14 --.

Signed and Sealed this
Ninth Day of July, 2013

Teresa Stanek Rea
*Acting Director of the United States Patent and Trademark Office*